United States Patent
Luo et al.

(10) Patent No.: US 9,820,245 B2
(45) Date of Patent: Nov. 14, 2017

(54) SAMPLE SELECTION FOR SECONDARY SYNCHRONIZATION SIGNAL (SSS) DETECTION

(71) Applicant: QUALCOMM Incorporated, San Diego, CA (US)

(72) Inventors: Tao Luo, San Diego, CA (US); Kapil Bhattad, San Diego, CA (US); Xiaoxia Zhang, San Diego, CA (US); Taesang Yoo, San Diego, CA (US); Xiliang Luo, Cardiff, CA (US); Ke Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 14/181,953

(22) Filed: Feb. 17, 2014

(65) Prior Publication Data
US 2014/0161043 A1   Jun. 12, 2014

Related U.S. Application Data

(63) Continuation of application No. 13/212,812, filed on Aug. 18, 2011, now Pat. No. 8,768,359.
(Continued)

(51) Int. Cl.
*H04W 72/04* (2009.01)
*H04W 56/00* (2009.01)
(Continued)

(52) U.S. Cl.
CPC ......... *H04W 56/001* (2013.01); *H04J 11/005* (2013.01); *H04J 11/0069* (2013.01);
(Continued)

(58) Field of Classification Search
None
See application file for complete search history.

(56) References Cited

U.S. PATENT DOCUMENTS 5,898,425 A   4/1999   Hirano
6,608,823 B1  8/2003   Kito
(Continued)

FOREIGN PATENT DOCUMENTS

CN   101527593 A   9/2009
CN   101689933 A   3/2010
(Continued)

OTHER PUBLICATIONS

European Search Report—EP13189369—Search Authority—Munich—Jan. 3, 2014.
(Continued)

*Primary Examiner* — Hassan Phillips
*Assistant Examiner* — Ayanah George
(74) *Attorney, Agent, or Firm* — Nerrie M. Zohn

(57) ABSTRACT

Methods and apparatus for selecting samples for secondary synchronization signal (SSS) detection are described. Several alternatives are provided for efficient cell identifier detection. In a first alternative, multiple bursts of a signal received from a cell are sampled with non-uniform spacing between sampling intervals to determine a sequence for cell identification. In a second alternative, samples of a first and a second signal received from a stronger cell are cancelled, and a sequence for detecting a weaker cell is determined by reducing effects of the samples of a third signal received from the weaker cell which do not overlap with the primary synchronization signal (PSS) or SSS of the stronger cell. In a third alternative, a sequence for detecting a weaker cell is
(Continued)

determined by reducing effects of any sampled bursts that correspond to a high transmission power portion of a signal from a stronger cell.

20 Claims, 17 Drawing Sheets

Related U.S. Application Data

(60) Provisional application No. 61/375,649, filed on Aug. 20, 2010.

(51) Int. Cl.
 *H04J 11/00* (2006.01)
 *H04W 24/02* (2009.01)

(52) U.S. Cl.
 CPC ......... *H04J 11/0093* (2013.01); *H04W 24/02* (2013.01); *H04W 72/042* (2013.01)

(56) References Cited

U.S. PATENT DOCUMENTS

| | | | |
|---|---|---|---|
| 6,760,366 B1 | 7/2004 | Wheatley, III et al. | |
| 6,924,727 B2 | 8/2005 | Nagaoka et al. | |
| 7,961,709 B2 | 6/2011 | Lindoff et al. | |
| 8,213,941 B2 | 7/2012 | Moe et al. | |
| 8,364,168 B2 | 1/2013 | Nardini | |
| 2002/0003785 A1* | 1/2002 | Agin | H04W 52/12 370/333 |
| 2004/0085921 A1 | 5/2004 | Lin | |
| 2005/0282547 A1 | 12/2005 | Kim et al. | |
| 2006/0046723 A1 | 3/2006 | Liu | |
| 2006/0293056 A1 | 12/2006 | Kim et al. | |
| 2009/0147893 A1 | 6/2009 | Takahashi et al. | |
| 2009/0197631 A1 | 8/2009 | Palanki et al. | |
| 2009/0227263 A1 | 9/2009 | Agrawal et al. | |
| 2009/0252075 A1 | 10/2009 | Ji et al. | |
| 2010/0008317 A1 | 1/2010 | Bhattad et al. | |
| 2010/0009689 A1 | 1/2010 | Jalloul et al. | |
| 2010/0020771 A1 | 1/2010 | Ji et al. | |
| 2010/0085913 A1 | 4/2010 | Subrahmanya | |
| 2010/0172278 A1* | 7/2010 | Nishio et al. | 370/312 |
| 2010/0323631 A1 | 12/2010 | Martin et al. | |
| 2011/0002430 A1 | 1/2011 | Kim et al. | |
| 2011/0092231 A1 | 4/2011 | Yoo et al. | |
| 2011/0103350 A1 | 5/2011 | Lindoff | |
| 2011/0149947 A1 | 6/2011 | Kim et al. | |
| 2011/0170496 A1* | 7/2011 | Fong | H04L 5/0053 370/329 |
| 2011/0310802 A1* | 12/2011 | Song | H04L 1/1812 370/328 |
| 2012/0033622 A1* | 2/2012 | Kalhan | H04L 5/0007 370/329 |
| 2012/0046056 A1 | 2/2012 | Luo et al. | |
| 2014/0161044 A1 | 6/2014 | Luo et al. | |

FOREIGN PATENT DOCUMENTS

| | | |
|---|---|---|
| CN | 101785220 A | 7/2010 |
| WO | WO-2009035983 A1 | 3/2009 |
| WO | WO-2009129413 A2 | 10/2009 |
| WO | WO-2009158546 A1 | 12/2009 |
| WO | WO-2010003034 A1 | 1/2010 |
| WO | WO-2010003040 A1 | 1/2010 |
| WO | WO-2010006289 | 1/2010 |

OTHER PUBLICATIONS

Guey J.C., et al., "Improving the Robustness of Target Cell Search in WCDMA Using Interference Cancellation", Wireless Networks, Communications and Mobile Computing, 2005 Internati onal Conference on Maui, HI, USA June 13-16, 2005, Piscataway, NJ, USA,IEEE, vol. 2, Jun. 13, 2005 (Jun. 13, 2005), pp. 879-883, XP010888077, DOI: 10.1109/Wirles.2005.1549528 ISBN: 978-0-7803-9305-9.

International Search Report and Written Opinion—PCT/US2011/048421—ISA/EPO—Jan. 12, 2012.

Partial International Search Report—PCT/US2011/048421—ISA/EPO—Nov. 21, 2011.

Yuan Shen, et al., "Neighboring Cell Search Techniques for LTE Systems", Communications (ICC), 2010 IEEE International Conference on, IEEE, Piscataway, NJ, USA, May 23, 2010 (May 23, 2010), pp. 1-6, XP031703651, ISBN: 978-1-4244-6402-9.

Ballou G., "Handbook for Sound Engineers", 4th Edition, 2008 Chapter 31, pp. 1161, 1162, 1164-1167.

* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

SAMPLE SELECTION FOR SECONDARY SYNCHRONIZATION SIGNAL (SSS) DETECTION

CROSS-REFERENCE TO RELATED APPLICATIONS

This application is a continuation of co-pending, commonly assigned, patent application Ser. No. 13/212,812 entitled "SAMPLE SELECTION FOR SECONDARY SYNCHRONIZATION SIGNAL (SSS) DETECTION," filed Aug. 18, 2011, which claims benefit of U.S. Provisional Patent Application Ser. No. 61/375,649, filed Aug. 20, 2010 and, the disclosures of which are herein incorporated by reference in their entirety.

BACKGROUND

I. Field

Certain aspects of the present disclosure generally relate to wireless communications and, more specifically, to selecting samples for secondary synchronization signal (SSS) detection.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure generally relate to selecting samples for secondary synchronization signal (SSS) detection. Various aspects are provided for efficient cell identifier detection. In one aspect, multiple bursts of a signal received from a cell are sampled with non-uniform spacing between sampling intervals to determine a sequence for cell identification. In another aspect, samples of a first and/or a second signal received from a stronger cell are cancelled, and a sequence for detecting a weaker cell is determined by reducing effects of the samples of a third signal received from the weaker cell which do not overlap with the first and/or the second signal. In yet another aspect, a sequence for detecting a weaker cell is determined by reducing effects of any sampled bursts that correspond to a high transmission power portion of a signal from a stronger cell. The first and/or the second signal may comprise a primary synchronization signal (PSS) and/or SSS.

In an aspect of the disclosure, a method for wireless communications is provided. The method generally includes receiving a first signal for determining a cell identity; sampling multiple bursts of the first signal during sampling intervals, wherein the bursts are sampled with non-uniform spacing between the sampling intervals; and determining at least one sequence of the first signal based on the sampled multiple bursts.

In an aspect of the disclosure, an apparatus for wireless communications is provided. The apparatus generally includes means for receiving a first signal for determining a cell identity; means for sampling multiple bursts of the first signal during sampling intervals, wherein the bursts are sampled with non-uniform spacing between the sampling intervals, and means for determining at least one sequence of the first signal based on the sampled multiple bursts.

In an aspect of the disclosure, an apparatus for wireless communications is provided. The apparatus generally includes at least one processor and a receiver. The receiver is generally configured to receive a first signal for determining a cell identity. The processor is typically configured to sample multiple bursts of the first signal during sampling intervals, wherein the bursts are sampled with non-uniform spacing between the sampling intervals, and to determine at least one sequence of the first signal based on the sampled multiple bursts.

In an aspect of the disclosure, a computer-program product for wireless communications is provided. The computer-program product generally includes a computer-readable medium having code for receiving a first signal for determining a cell identity; sampling multiple bursts of the first signal during sampling intervals, wherein the bursts are sampled with non-uniform spacing between the sampling intervals; and determining at least one sequence of the first signal based on the sampled multiple bursts.

In an aspect of the disclosure, a method for wireless communications. The method generally includes receiving, from a stronger cell, first and second signals for determining a cell identity of the stronger cell; receiving, from a weaker cell, a third signal for determining at least a portion of a cell identity of the weaker cell, wherein at least a portion of the third signal overlaps at least one of the first signal and the second signal; sampling the first, second, and third signals; cancelling out samples of at least one of the first and second signals; and determining at least one sequence of the third signal based on samples of the third signal after reducing effects of samples of any remaining portion of the third signal that does not overlap the first signal and/or the second signal.

In an aspect of the disclosure, an apparatus for wireless communications is provided. The apparatus generally includes means for receiving, from a stronger cell, first and second signals for determining a cell identity of the stronger cell; means for receiving, from a weaker cell, a third signal for determining at least a portion of a cell identity of the weaker cell, wherein at least a portion of the third signal overlaps at least one of the first signal and the second signal; means for sampling the first, second, and third signals; means for cancelling out samples of at least one of the first and second signals; and means for determining at least one sequence of the third signal based on samples of the third signal after reducing effects of samples of any remaining portion of the third signal that does not overlap the first signal and/or the second signal.

In an aspect of the disclosure, an apparatus for wireless communications is provided. The apparatus generally includes at least one processor and a receiver. The receiver is generally configured to receive, from a stronger cell, first and second signals for determining a cell identity of the stronger cell, and to receive, from a weaker cell, a third signal for determining at least a portion of a cell identity of the weaker cell, wherein at least a portion of the third signal overlaps at least one of the first signal and the second signal. The processor is typically configured to sample the first, second, and third signals; to cancel out samples of at least one of the first and second signals; and to determine at least one sequence of the third signal based on samples of the third signal after reducing effects of samples of any remaining portion of the third signal that does not overlap the first signal and/or the second signal.

In an aspect of the disclosure, a computer-program product for wireless communications is provided. The computer-program product generally includes a computer-readable medium having code for receiving, from a stronger cell, first and second signals for determining a cell identity of the stronger cell; receiving, from a weaker cell, a third signal for determining at least a portion of a cell identity of the weaker cell, wherein at least a portion of the third signal overlaps at least one of the first signal and the second signal; sampling the first, second, and third signals; cancelling out samples of at least one of the first and second signals; and determining at least one sequence of the third signal based on samples of the third signal after reducing effects of samples of any remaining portion of the third signal that does not overlap the first signal and/or the second signal.

In an aspect of the disclosure, a method for wireless communications. The method generally includes receiving, from a stronger cell, a first signal, wherein first portions of the first signal are transmitted at a first transmission power and second portions of the first signal are transmitted at a second transmission power, wherein the second transmission power is lower than the first transmission power; receiving, from a weaker cell, a second signal for determining a cell identity of the weaker cell; sampling multiple bursts of the second signal; and determining at least one sequence of the second signal based on the sampled multiple bursts after reducing effects, to the determination, of any sampled multiple bursts corresponding to the first portions of the first signal.

In an aspect of the disclosure, an apparatus for wireless communications is provided. The apparatus generally includes means for means for receiving, from a stronger cell, a first signal, wherein first portions of the first signal are transmitted at a first transmission power and second portions of the first signal are transmitted at a second transmission power, wherein the second transmission power is lower than the first transmission power; means for receiving, from a weaker cell, a second signal for determining a cell identity of the weaker cell; means for sampling multiple bursts of the second signal; and means for determining at least one sequence of the second signal based on the sampled multiple bursts after reducing effects, to the determination, of any sampled multiple bursts corresponding to the first portions of the first signal.

In an aspect of the disclosure, an apparatus for wireless communications is provided. The apparatus generally includes at least one processor and a receiver. The receiver is generally configured to receive, from a stronger cell, a first signal, wherein first portions of the first signal are transmitted at a first transmission power and second portions of the first signal are transmitted at a second transmission power, wherein the second transmission power is lower than the first transmission power; and to receive, from a weaker cell, a second signal for determining a cell identity of the weaker cell. The processor is typically configured to sample multiple bursts of the second signal and to determine at least one sequence of the second signal based on the sampled multiple bursts after reducing effects, to the determination, of any sampled multiple bursts corresponding to the first portions of the first signal.

In an aspect of the disclosure, a computer-program product for wireless communications is provided. The computer-program product generally includes a computer-readable medium having code for receiving, from a stronger cell, a first signal, wherein first portions of the first signal are transmitted at a first transmission power and second portions of the first signal are transmitted at a second transmission power, wherein the second transmission power is lower than the first transmission power; receiving, from a weaker cell, a second signal for determining a cell identity of the weaker cell; sampling multiple bursts of the second signal; and determining at least one sequence of the second signal based on the sampled multiple bursts after reducing effects, to the determination, of any sampled multiple bursts corresponding to the first portions of the first signal.

In an aspect of the disclosure, a method for wireless communications. The method generally includes receiving, from a stronger cell, a first signal for determining a cell identity of the stronger cell; receiving, from a weaker cell, a second signal for determining a cell identity of the weaker cell, wherein the second signal observes interference from the first signal; sampling multiple bursts of the first and second signals; cancelling out at least a portion of the first signal; and determining at least one sequence of the second signal based on sampled bursts of the second signal after reducing effects, to the determination, of at least a portion of the sampled bursts of the second signal based on the interference from a remaining portion of the first signal that is not cancelled.

In an aspect of the disclosure, an apparatus for wireless communications is provided. The apparatus generally includes means for receiving, from a stronger cell, a first signal for determining a cell identity of the stronger cell; means for receiving, from a weaker cell, a second signal for determining a cell identity of the weaker cell, wherein the second signal observes interference from the first signal; means for sampling multiple bursts of the first and second signals; means for cancelling out at least a portion of the first signal; and means for determining at least one sequence of the second signal based on sampled bursts of the second signal after reducing effects, to the determination, of at least a portion of the sampled bursts of the second signal based on the interference from a remaining portion of the first signal that is not cancelled.

In an aspect of the disclosure, an apparatus for wireless communications is provided. The apparatus generally includes at least one processor and a receiver. The receiver is generally configured to receive, from a stronger cell, a first signal for determining a cell identity of the stronger cell; and receive, from a weaker cell, a second signal for determining a cell identity of the weaker cell, wherein the second signal observes interference from the first signal. The processor is generally configured to sample multiple bursts of the first and second signals; cancel out at least a portion of the first signal; and determine at least one sequence of the second signal based on sampled bursts of the second signal after reducing effects, to the determination, of at least a portion of the sampled bursts of the second signal based on the interference from a remaining portion of the first signal that is not cancelled.

In an aspect of the disclosure, a computer-program product for wireless communications is provided. The computer-program product generally includes a computer-readable medium having code for receiving, from a stronger cell, a first signal for determining a cell identity of the stronger cell; receiving, from a weaker cell, a second signal for determining a cell identity of the weaker cell, wherein the second signal observes interference from the first signal; sampling multiple bursts of the first and second signals; cancelling out at least a portion of the first signal; and determining at least one sequence of the second signal based on sampled bursts of the second signal after reducing effects, to the determination, of at least a portion of the sampled bursts of the second signal based on the interference from a remaining portion of the first signal that is not cancelled.

Various aspects and features of the disclosure are described in further detail below.

BRIEF DESCRIPTION OF THE DRAWINGS

FIG. 5 illustrates example resource partitioning in a heterogeneous network in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
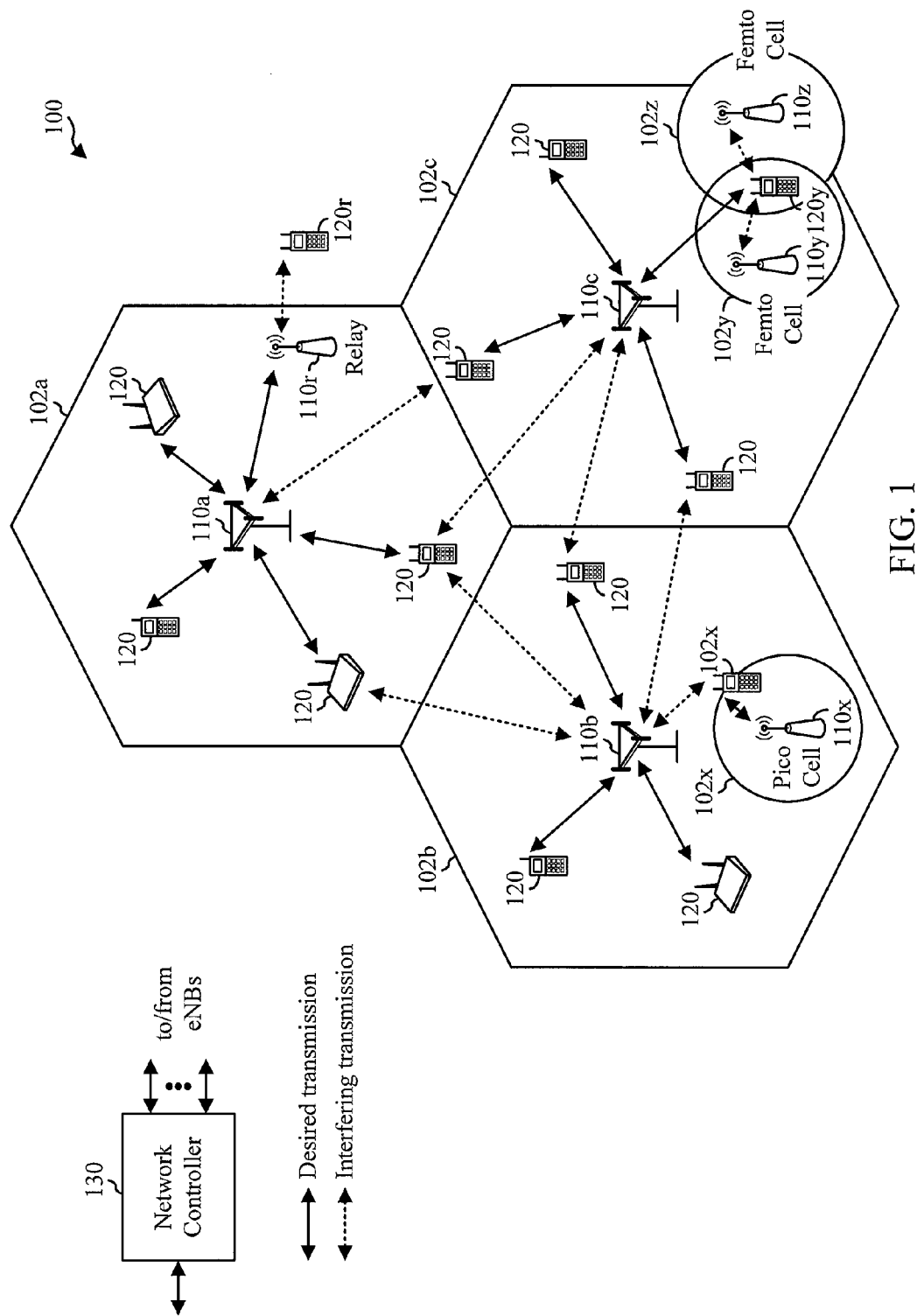
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc.

In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
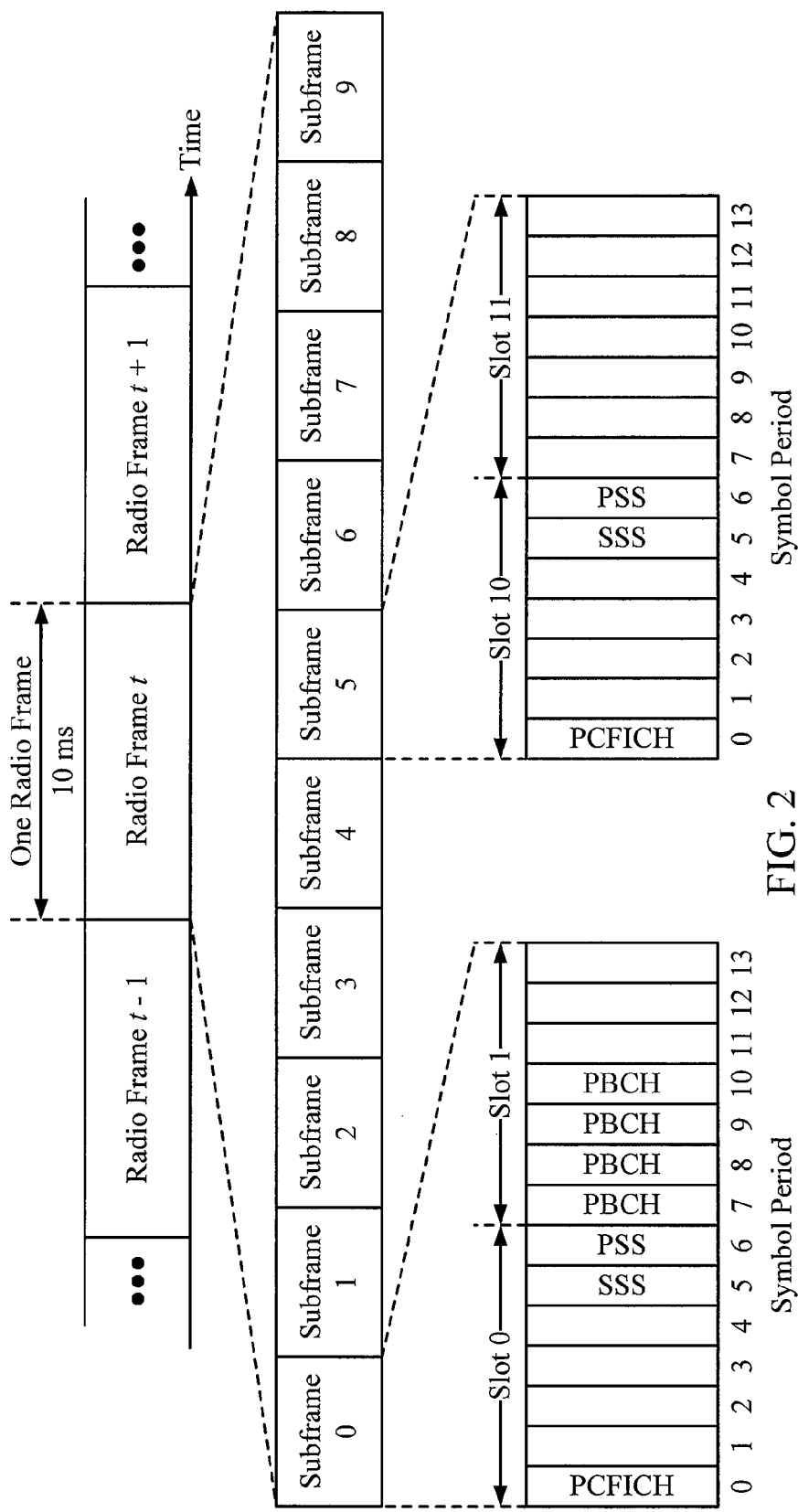
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
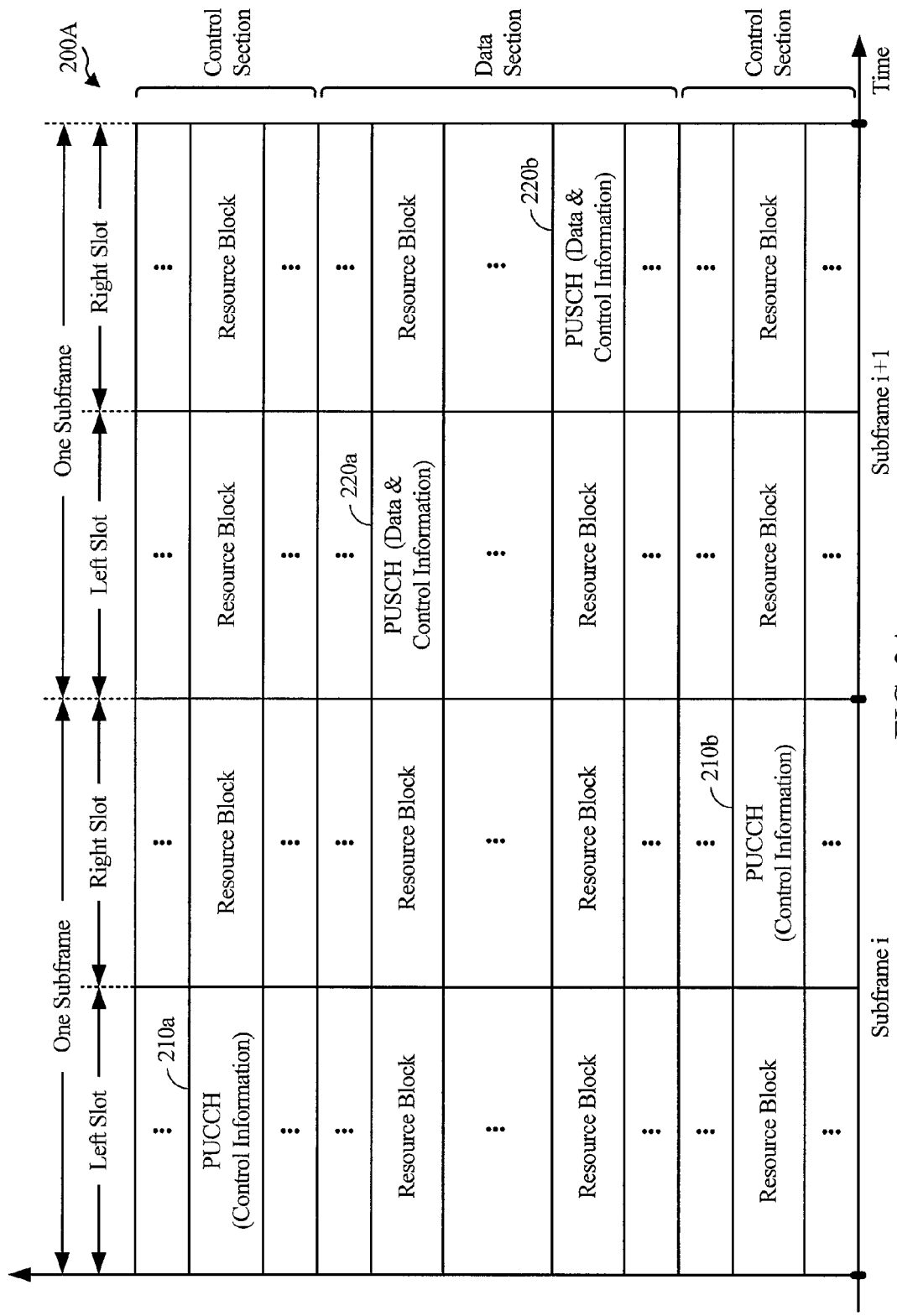
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
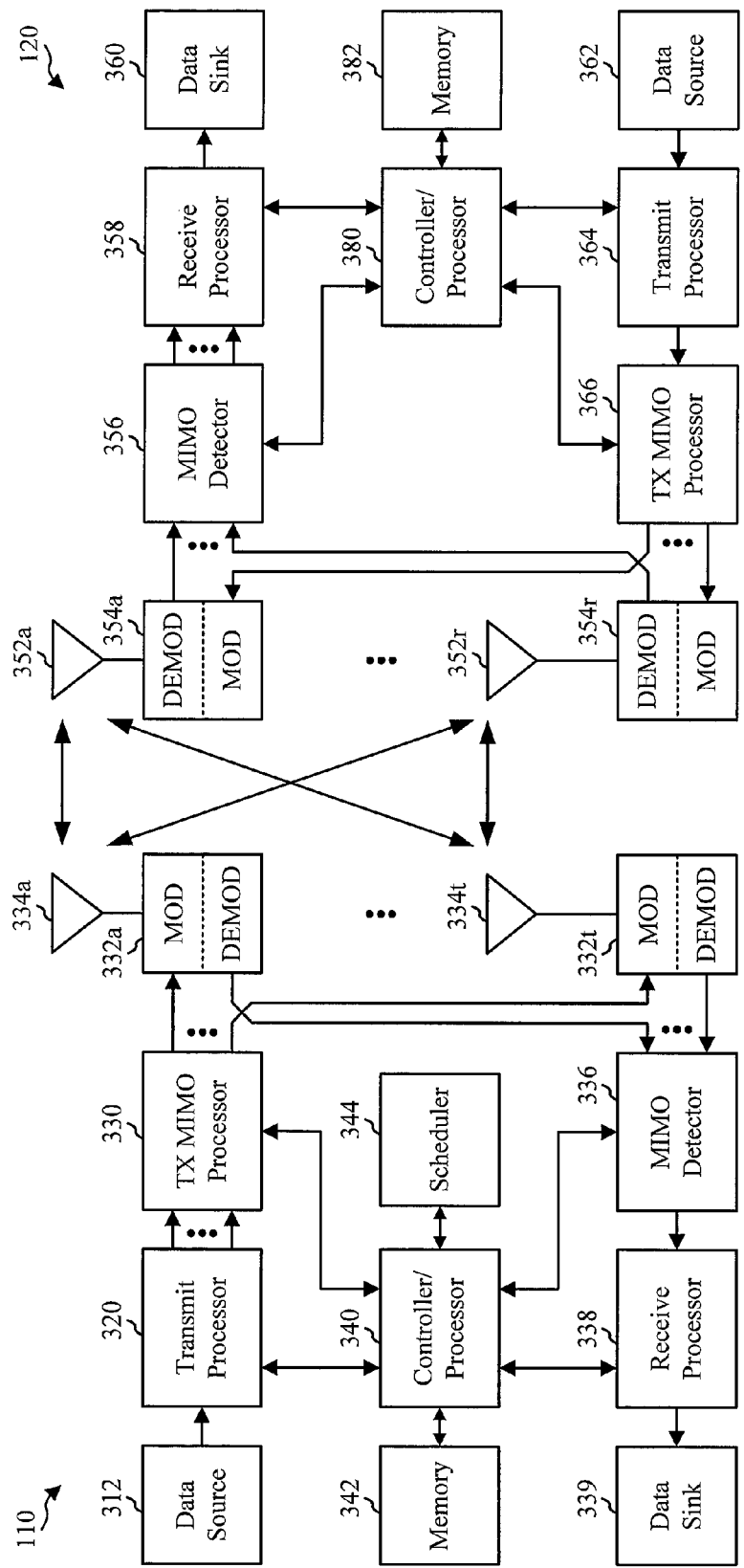
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations for blocks 800 in FIG. 8, operations for blocks 1000 in FIG. 10, operations for blocks 1100 in FIG. 11, and/or other processes for the techniques described herein. The memories 342 and 382 may store data and program codes for base station 110 and UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce or eliminate interference by the interfering cell's giving up part of its resources. Using eICIC or similar techniques, a UE may access a serving cell using the resources yielded by the interfering cell, where otherwise the UE would experience severe interference.

For example, a femto cell with a closed access mode (i.e., only a member femto UE can access the cell) in an open macro cell's coverage can create a coverage hole for a macro cell. By making a femto cell give up some of its resources, the macro UE under the femto cell coverage area can access the UE's serving macro cell by using the resources yielded by a femto cell.

In a radio access system using OFDM, such as E-UTRAN, the resources yielded by the interfering cell may be time-based, frequency-based, or a combination of both. When the yielded resources are time-based, the interfering cell does not use some of the subframes in the time domain. When the yielded resources are frequency-based, the interfering cell does not use some of the subcarriers in the frequency domain. When the yielded resources are a combination of both frequency and time, the interfering cell does not use certain resources defined by frequency and time.

Figure 4:
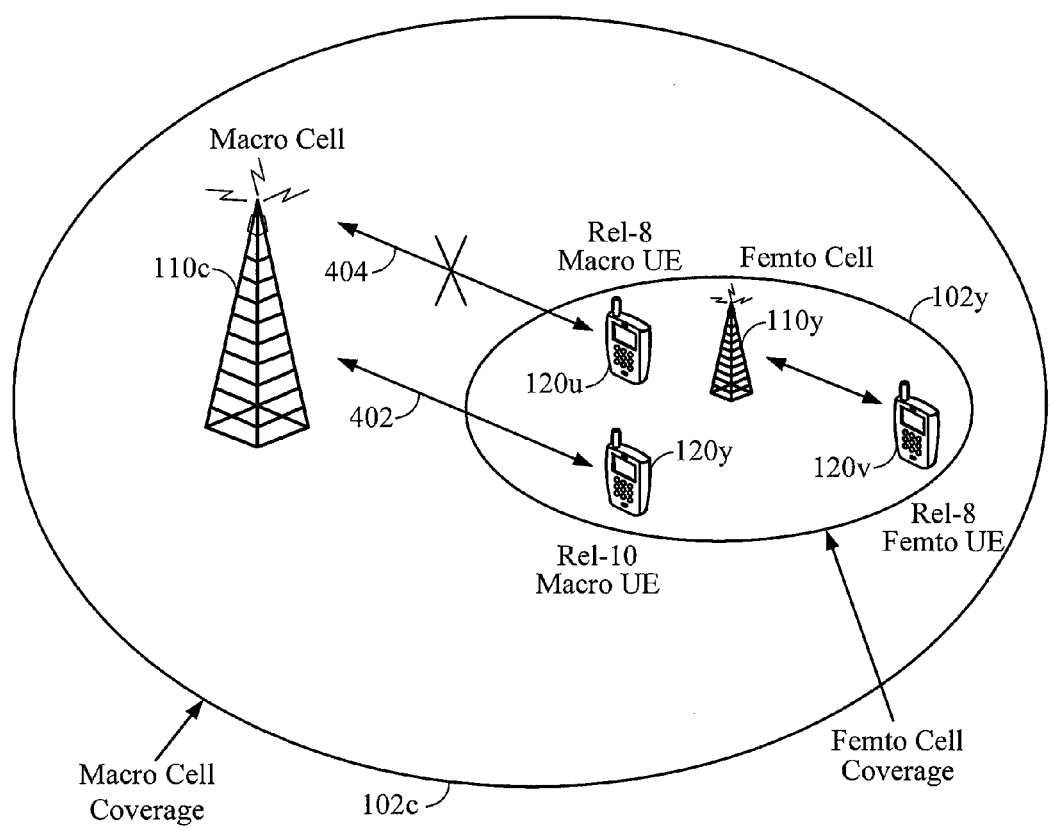
FIG. 4 illustrates an example heterogeneous network in accordance with certain aspects of the present disclosure.

FIG. 4 illustrates an example scenario where eICIC may allow the macro UE 120y supporting eICIC (e.g., a Rel-10 macro UE as shown in FIG. 4) to access the macro cell 110c even when the macro UE 120y is experiencing severe interference from the femto cell 110y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A femto UE 120v (e.g., a Rel-8 femto UE as shown in FIG. 4) may access the femto cell 110y without any interference problems from the macro cell 110c.

According to certain aspects, the resource partitioning between base stations may be done time based. As an example, for E-UTRAN, resources may be partitioned by subframes.

According to certain aspects, networks may support enhanced interference coordination, where there may be different sets of partitioning information. A first of these may be referred to as semi-static resource partitioning information (SRPI). A second of these sets may be referred to as adaptive resource partitioning information (ARPI). As the name implies, SRPI typically does not change frequently, and SRPI may be sent to the UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For the downlink (e.g., from an eNB to a UE), the partitioning pattern may be mapped to a known subframe (e.g., a first subframe of each radio frame that has a system frame number (SFN) value that is a multiple of an integer N, such as multiples of 4). Such a mapping may be applied in order to determine resource partitioning information for a specific subframe. As an example, a subframe that is subject to coordinated resource partitioning (e.g., yielded by an interfering cell) for the downlink may be identified by an index:

IndexSRPI_DL=(SFN*10+subframe number) mod 8

For the uplink, the SRPI mapping may be shifted, for example, by 4 ms. Thus, an example for the uplink may be:

IndexSRPI_UL=(SFN*10+subframe number+4) mod 8

SRPI may use the following three values for each entry:
U (Use): this value indicates the subframe has been cleaned up from the dominant interference to be used by this cell (i.e., the main interfering cells do not use this subframe);
N (No Use): this value indicates the subframe shall not be used; and
X (Unknown): this value indicates the subframe is not statically partitioned. Details of resource usage negotiation between base stations are not known to the UE.

Another possible set of parameters for SRPI may be the following:
U (Use): this value indicates the subframe has been cleaned up from the dominant interference to be used by this cell (i.e., the main interfering cells do not use this subframe);
N (No Use): this value indicates the subframe shall not be used;

X (Unknown): this value indicates the subframe is not statically partitioned (and details of resource usage negotiation between base stations are not known to the UE); and C (Common): this value may indicate all cells may use this subframe without resource partitioning. This subframe may be subject to interference, so that the base station may choose to use this subframe only for a UE that is not under severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g., macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identities (PCIs).

ARPI may represent further resource partitioning information with the detailed information for the 'X' subframes in SRPI. As noted above, detailed information for the 'X' subframes is typically only known to the base stations.

Figure 6:
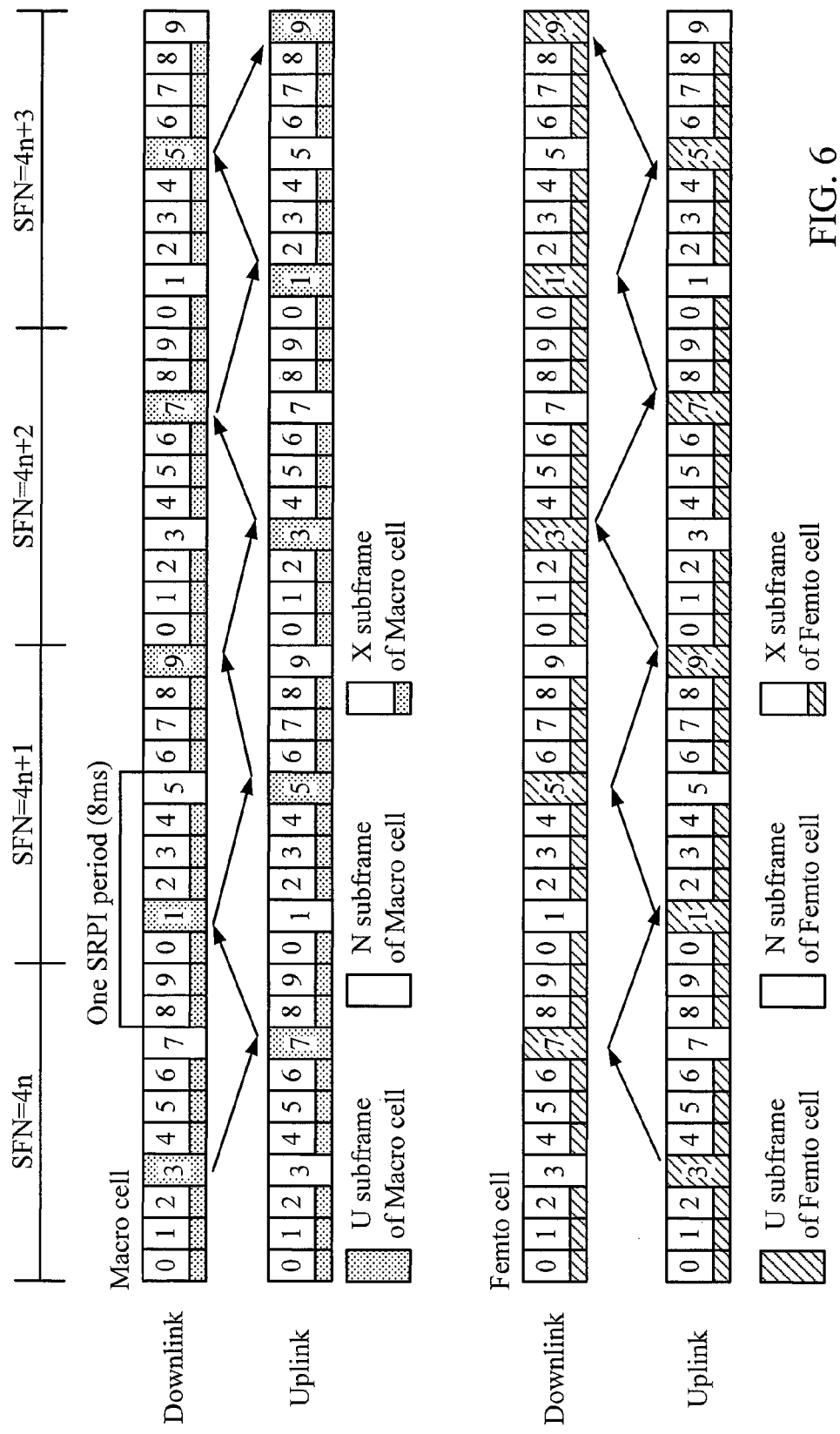
FIG. 6 illustrates example cooperative partitioning of subframes in a heterogeneous network in accordance with certain aspects of the present disclosure.

FIGS. 5 and 6 illustrate examples of SRPI assignment as described above in the scenario with macro and femto cells. A U, N, X, or C subframe is a subframe corresponding to a U, N, X, or C SRPI assignment.

Example Sample Selection for SSS Detection

In LTE, cell identities range from 0 to 503. Synchronization signals are transmitted in the center 62 resource elements (REs) around the DC tone to help detect cells. The synchronization signals comprise two parts: a primary synchronization signal (PSS) and a secondary synchronization signal (SSS).

Figure 7:
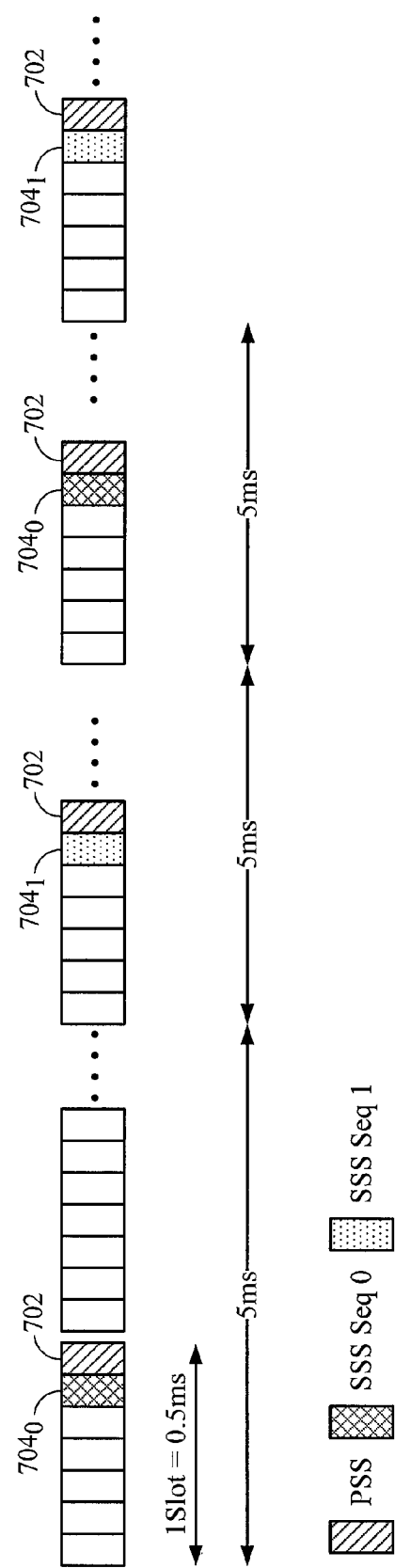
FIG. 7 illustrates an example primary synchronization signal (PSS) sequence and alternating secondary synchronization signal (SSS) sequences with a periodicity of 5 ms, in accordance with certain aspects of the present disclosure.

FIG. 7 illustrates an example PSS sequence 702 and alternating SSS sequences $704_0$, $704_1$ with a periodicity of 5 ms, in accordance with certain aspects of the present disclosure. The PSS allows a UE to obtain frame timing modulo 5 ms and part of the physical layer cell identifier (cell ID), and specifically cell id modulo 3. Three different PSS sequences exist with each sequence mapping to a disjoint group of 168 cell IDs. Based on Zadoff-Chu (ZC) sequences, the PSS sequence is chosen from one of 3 sequences based on a PSS Index=Cell ID modulo 3. The same sequence is transmitted every 5 ms as shown in FIG. 7.

The SSS is used by the UE to detect the LTE frame timing modulo 10 ms and to obtain the cell ID. The SSS is transmitted twice in each 10 ms radio frame as depicted in FIG. 7. The SSS sequences are based on maximum length sequences, known as M-sequences, and each SSS sequence is constructed by interleaving, in the frequency-domain, two length-31 Binary Phase Shift Keying (BPSK)-modulated sequences. These two codes are two different cyclic shifts of a single length-31 M-sequence. The cyclic shift indices of the M-sequences are derived from a function of the physical layer cell identity group. The two codes are alternated between the first and second SSS transmissions in each radio frame.

In other words, two sequences for a cell ID that alternate every 5 ms are transmitted. The SSS sequence is obtained by first choosing from a set of 168 different sequences (different sets for subframes 0 and 5) based on an SSS Index (=floor (Cell ID/3)) and then scrambling the chosen sequence using a sequence which is a function of the PSS Index. Hence, while searching for the SSS, if the PSS Index is known, a UE may only need to search up to 168 sequences.

Spacing between the PSS and the SSS helps a UE to distinguish between extended cyclic prefix (CP) and normal CP modes and between TDD (time division duplex) and FDD (frequency division duplex) modes.

A typical searching operation may involve first locating the PSS sequences transmitted by neighboring eNBs (i.e., determining the timing and the PSS index), followed by SSS detection for the found PSS Index around the determined timing.

Both PSS and SSS detection may involve using samples over multiple bursts to improve the chances of detection and reduce false detection rates. Using multiple bursts provides time diversity. Spacing the bursts far apart improves the time diversity, but increases the time taken for detection.

When employing multiple bursts for SSS detection, it is beneficial to include the sampled bursts corresponding to both SSS sequences. For certain implementations, the bursts used for the multiple-burst detection are equally spaced. For example, for four bursts:

- 5 ms sampling interval spacing involves using the SSS samples starting at about 0, 5, 10, and 15 ms, which leads to using subframes alternating between 0 and 5.
- 10 ms sampling interval spacing involves using the SSS samples starting at about 0, 10, 20, 30 ms, which leads to all subframe used being either all 0 or all 5.
- 15 ms sampling interval spacing involves using the SSS samples starting at about 0, 15, 30, 45 ms, which leads to using subframes alternating between 0 and 5.

Sometimes choosing 5 ms spacing may not be feasible since the time taken to perform the SSS detection (i.e., the processing) may be more than 5 ms and the UE may not have the next 5 ms samples in the buffer by the time the UE has completed the detection on the SSS samples in the first 5 ms because these next samples may be overwritten with new samples. In this case, the minimum spacing between bursts may be 10 ms. The UE may also choose a minimum spacing of 10 ms to improve time diversity. In this case, if periodic spacing between bursts is used and if both SSS sequences are to be used, the UE is forced to use 15 ms spacing, which increases the detection time.

An alternative is to use non-uniform spacing between sampling intervals. For example, for the case of sampling four bursts, the UE could sample SSS on slots starting at about 0, 10, 25, and 35 ms, which leads to using subframes 0, 0, 5, and 5, respectively. This leads to a 10 ms saving in detection time over the case of sampling four bursts with 15 ms spacing between all the bursts. As another example, for the case of sampling eight bursts, the UE could sample SSS on slots starting at about 0, 10, 25, 35, 45, 55, 70, and 80 ms, which leads to using subframes 0, 0, 5, 5, 5, 5, 0, and 0, respectively. This leads to a 25 ms saving in detection time over the case of sampling eight bursts with 15 ms spacing between all the bursts. In this case, the detection time savings for sampling eight bursts is 25 ms. In another example for sampling eight bursts, the UE could sample SSS on slots starting at about 0, 10, 20, 30, 45, 55, 65, and 75 ms, which leads to using subframes 0, 0, 0, 0, 5, 5, 5, and 5, respectively. In this case, the detection time savings for sampling eight bursts is 30 ms.

Figure 8:
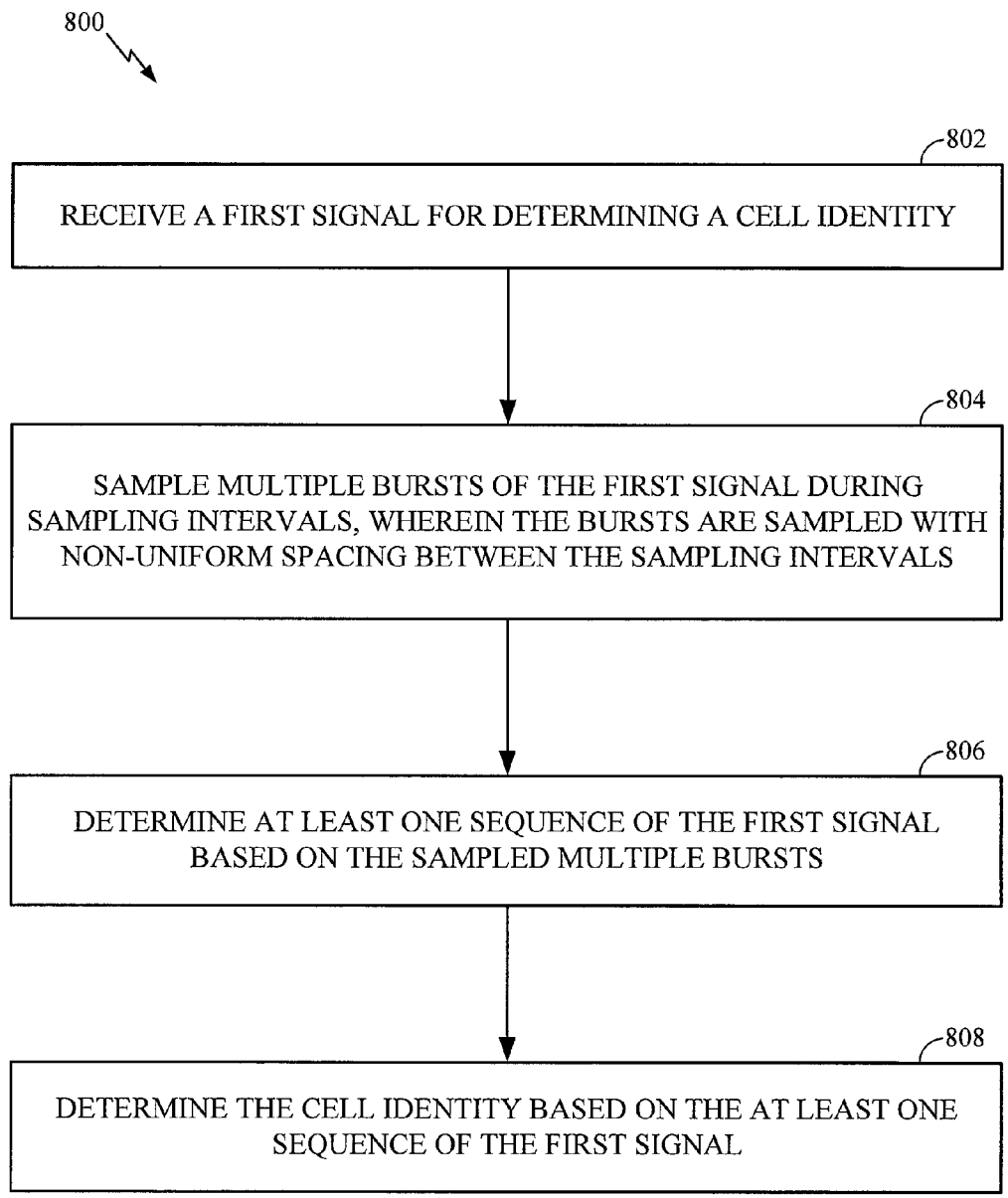
FIG. 8 is a functional block diagram conceptually illustrating example blocks executed to determine, from the perspective of the UE, at least one sequence of a first signal for determining a cell identity based on multiple bursts sampled with non-uniform spacing between sampling intervals, in accordance with certain aspects of the present disclosure.

FIG. 8 is a functional block diagram conceptually illustrating example blocks 800 executed, from the perspective of the UE, to determine at least one sequence of a first signal for determining a cell identity based on multiple bursts sampled with non-uniform spacing between sampling intervals. Operations illustrated by the blocks 800 may be executed, for example, at the processor(s) 358 and/or 380 of the UE 120 from FIG. 3.

The operations may begin at block 802 by receiving a first signal for determining a cell identity (e.g., an SSS). At block 804, the UE may sample multiple bursts (e.g., 4 bursts) of the first signal during sampling intervals, wherein the bursts are sampled with non-uniform spacing between the sampling intervals. At least one sequence of the first signal may be determined at block 806 based on the sampled multiple bursts. At block 808, the UE may determine the cell identity based on the at least one sequence of the first signal. The cell identity may comprise a physical cell identifier (PCI, or PCID) of a Long Term Evolution (LTE) Release 10 cell.

In an aspect, determining the at least one sequence includes determining two sequences of the first signal, wherein the bursts of the first signal alternate between the two sequences. In an aspect, the two signals are sampled equally.

In certain aspects, in addition to receiving the SSS, a PSS may also be received. An additional sequence may be determined based on the PSS and the cell identity may be determined based on the sequences of the SSS and the PSS.

Figure 8A:
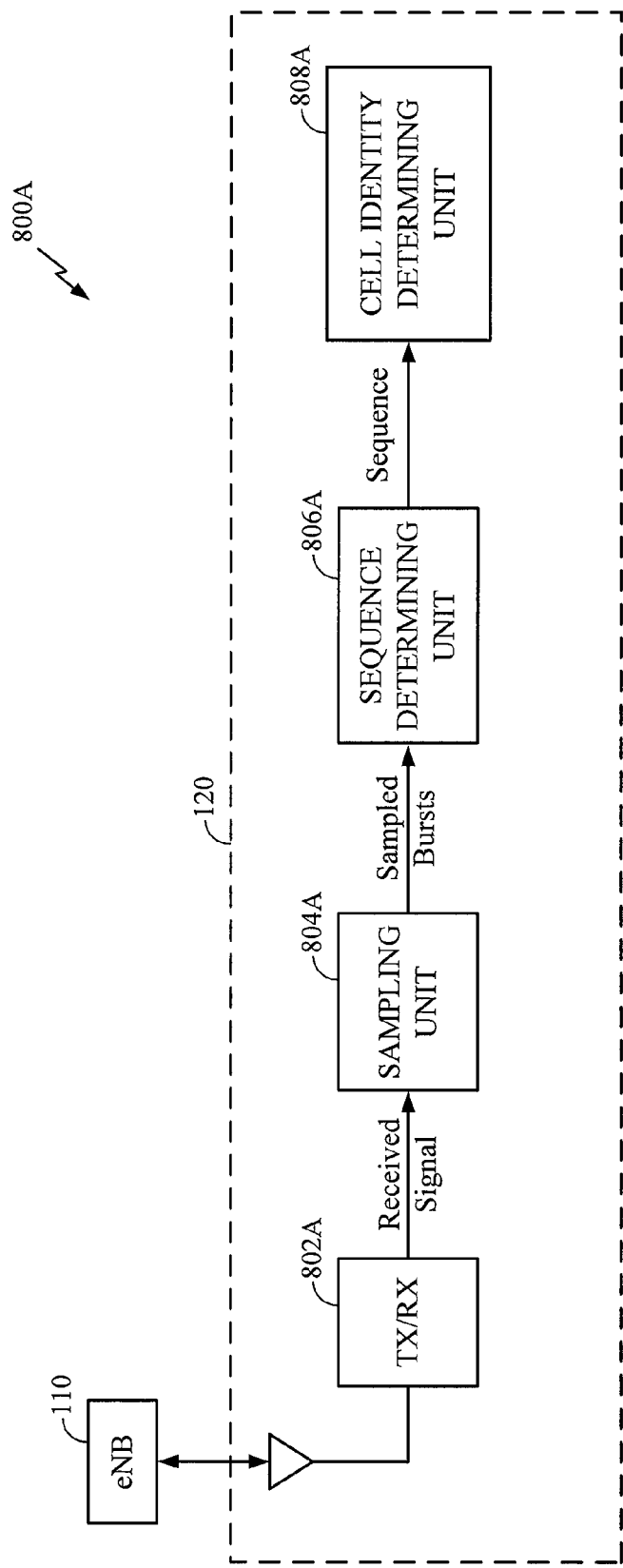
FIG. 8A illustrates example components capable of performing the operations illustrated in FIG. 8.

The operations 800 described above may be performed by any suitable components or other means capable of performing the corresponding functions of FIG. 8. For example, operations 800 illustrated in FIG. 8 correspond to components 800A illustrated in FIG. 8A. In FIG. 8A, a transceiver (TX/RX) 802A may receive a first signal for determining a cell identity. A sampling unit 804A may sample multiple bursts of the first signal during sampling intervals, wherein the bursts are sampled with non-uniform spacing between the sampling intervals. A sequence determining unit 806A may determine at least one sequence of the first signal based on the sampled multiple bursts. A cell identity determining unit 808A may determine the cell identity based on the at least one sequence of the first signal.

With the enhanced ICIC (eICIC) solutions in LTE Rel-10 and beyond, the strong cell(s) may reduce the transmission power as one solution for the UE to acquire the weak cell. In this case, the UE 120 may choose to acquire the weak cell by combining bursts from across those subframes with less interference from the strong cell.

In synchronous networks as described above with respect to eICIC, the synchronization signals may overlap with each other. In this case cancelling the synchronization signals of stronger neighboring eNBs and performing PSS/SSS detection on the cancelled samples may improve the detection probability of weaker cells. It should be noted that due to the limited number of PSS sequences, the likelihood of two cells sharing the same PSS sequence may be high. Therefore, it may be difficult to distinguish PSS Index and, more particularly, the timing of cells that have the same PSS index. In this case, the UE may perform SSS detection directly for multiple timing hypotheses and multiple PSS index hypotheses.

Figure 9:
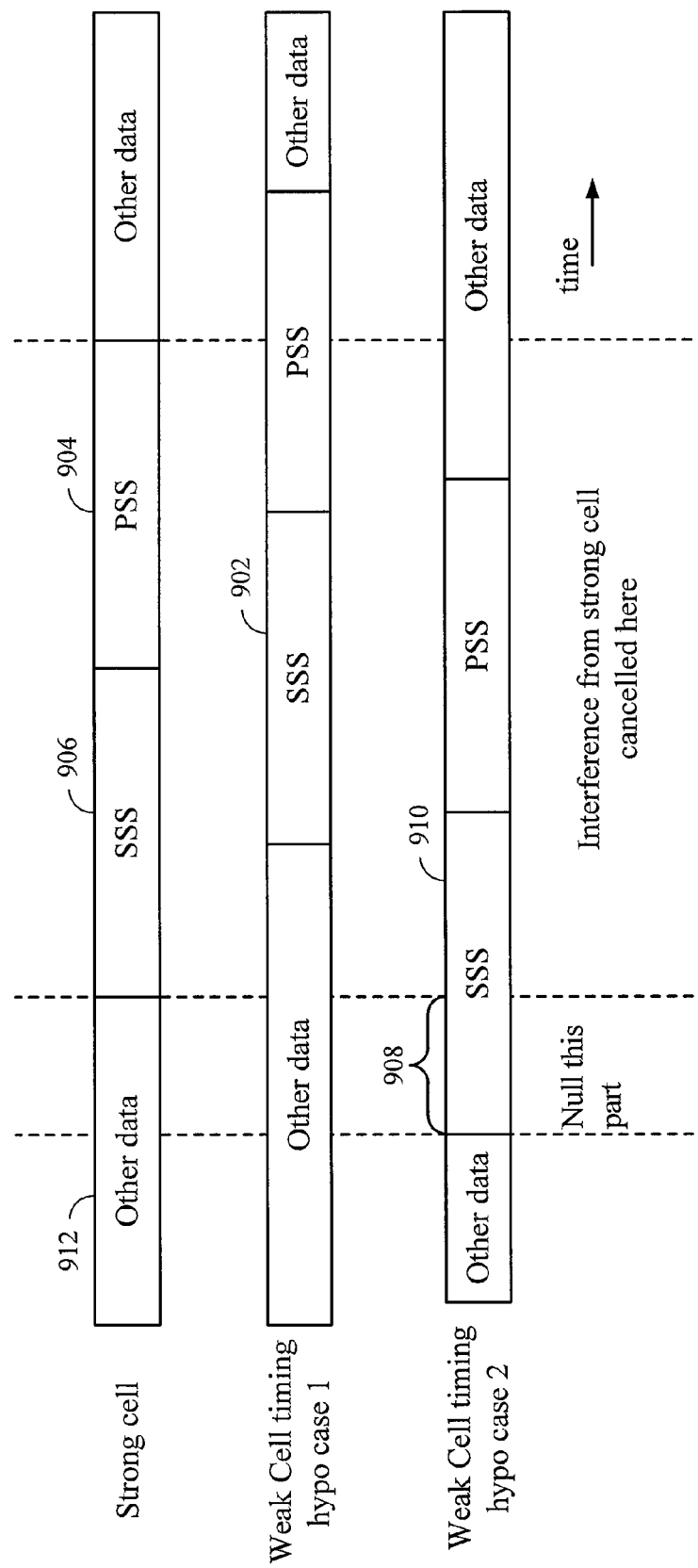
FIG. 9 illustrates two different overlap scenarios for the signals for determining the cell identities of the stronger and the weaker cells, in accordance with certain aspects of the present disclosure.

As an example, FIG. 9 illustrates two different overlap scenarios for the signals for determining the cell identities of stronger cells (e.g., femto cell 102y) and weaker cells (e.g., macro cell 102c), in accordance with certain aspects of the present disclosure. In FIG. 9, two timing hypotheses are considered for the weaker cell: positive and negative time offset with respect to the strongest cell, due to the propagation delay from transmission to reception by the UE. In timing hypothesis 1, the SSS 902 of the weak cell overlaps with the PSS 904 and SSS 906 of the strong cell, whose samples may be cancelled by the UE. Consequently, strong interference does not interfere with the samples of the SSS 902, and hence, all these samples may be used for weak cell SSS detection.

For the second hypothesis in FIG. 9, a portion 908 of the samples from the SSS 910 of the weaker cell see interference from the stronger cell, whose samples from the other data portion 912 have not been cancelled. In this case, it may be beneficial to ignore (i.e., not consider) those portions of the received signal for which cancellation is not done while performing SSS detection of the weaker cell. Alternately, the UE may consider the samples from portion 908, but may give them lower weight due to higher noise in that portion 908.

In certain aspects, for timing hypothesis 1, PSS cancellation may be skipped due to additional complexity involved when compared to cancelling SSS only. In such cases, while performing SSS detection for the weaker cell, those portions of the SSS 902 which overlap with the PSS 904 of the stronger may be ignored.

Figure 12:
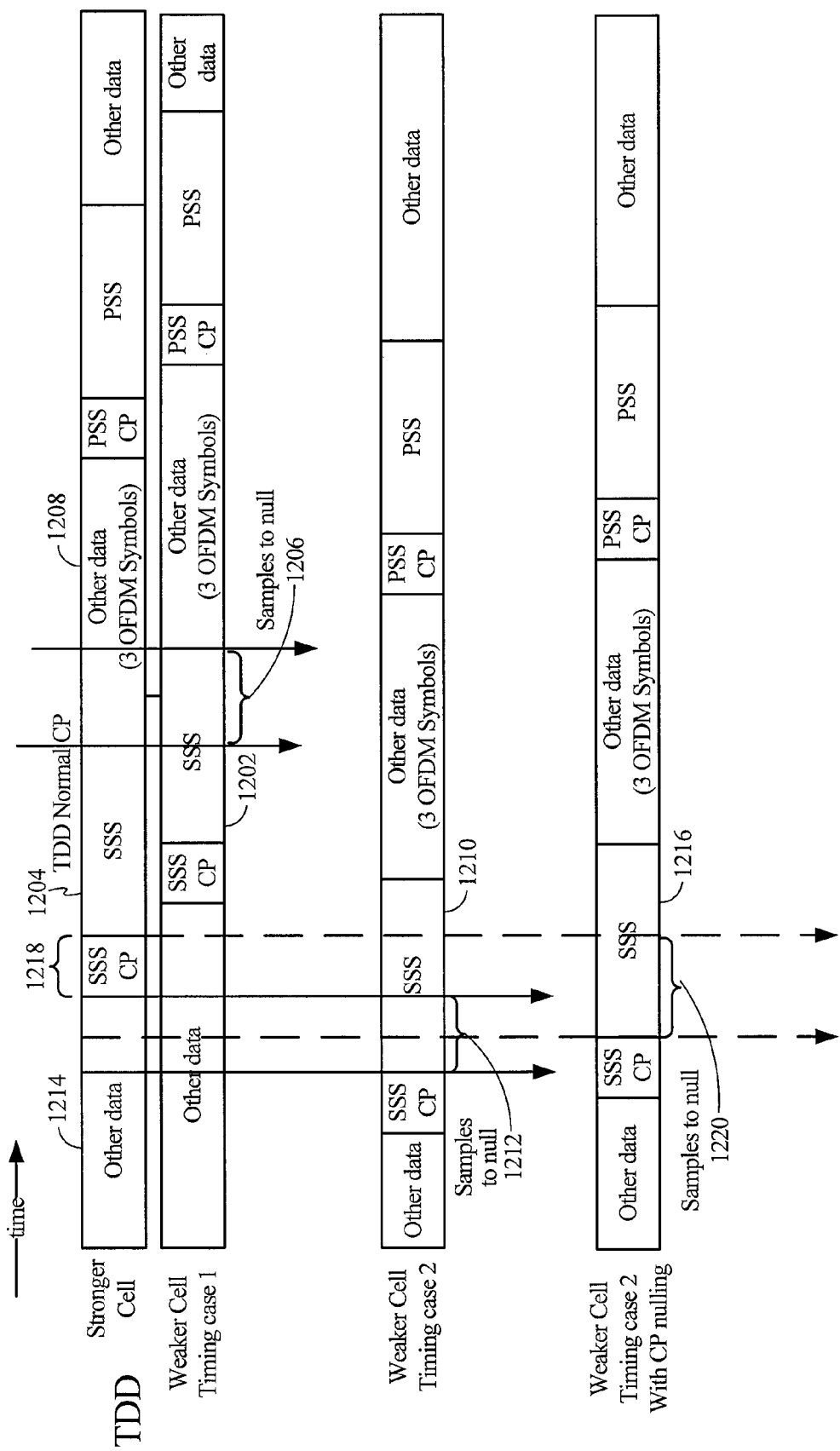
FIG. 12 illustrates three different overlap scenarios for time division duplexing (TDD) signals for determining the cell identities of a stronger cell and weaker cells, in accordance with certain aspects of the present disclosure.

FIG. 12 illustrates three different overlap scenarios for TDD signals for determining the cell identities of stronger cells (e.g., femto cell 102y) and weaker cells (e.g., macro cell 102), in accordance with certain aspects of the present disclosure. In FIG. 12, three timing hypotheses are considered for the weaker cell. In certain aspects, unlike FDD signals where the PSS and SSS may be allocated on neighboring symbol periods, PSS/SSS in TDD signals (as shown in FIG. 12) may not be allocated on neighboring symbol periods.

In timing case 1, an SSS 1202 of the weaker cell overlaps with an SSS 1204 of the stronger cell. As discussed above, the samples of the SSS 1204 may be cancelled. Further, a portion 1206 from the SSS 1202 of the weaker cell may experience interference from the stronger cell whose samples from the other data portion 1208 have not been cancelled. In this case, while performing SSS detection of the weaker cell, the effects of the portion 1206 of the SSS 1202 of the weaker cell corresponding to the other data portion 1208 of the stronger cell may be reduced, either by not considering (i.e., ignoring) samples for the portion 1206 or by giving them lower weight.

In timing case 2, an SSS 1210 of the weaker cell overlaps with an SSS 1204 of the stronger cell. A portion 1212 from the SSS 1210 of the weaker cell may experience interference from the stronger cell whose samples from the other data portion 1214 have not been cancelled. In this case, while performing SSS detection of the weaker cell, the effects of the portion 1212 of the SSS 1210 of the weaker cell corresponding to the other data portion 1214 of the stronger cell may be reduced either by not considering samples for the portion 1212 or by giving them lower weight.

In timing case 3, an SSS 1216 of the weaker cell overlaps with an SSS 1204 of the stronger cell. As discussed above, the samples of the SSS 1204 are cancelled. As shown in FIG. 12, the SSS 1204 includes an SSS CP portion 1218. In certain aspects, cancellation of the CP portion 1218 may not be very accurate, and thus, a portion 1220 from the SSS 1216 of the weaker cell may experience interference from the SSS CP portion 1218 (that has not been properly cancelled) in addition to the other data portion 1214 that has not been cancelled. In this case, while performing SSS detection of the weaker cell, the effects of the portion 1220 of the SSS 1216 of the weaker cell corresponding to the other data portion 1214 and the SSS CP portion 1218 of the stronger cell may be reduced, either by not considering samples for the portion 1220 or by giving them lower weight.

Thus, for certain aspects, it may be beneficial to null out at least part of the CP portion of a stronger cell (e.g., SSS CP portion 1218) since cancellation of the CP portion may not be accurate.

Figure 13:
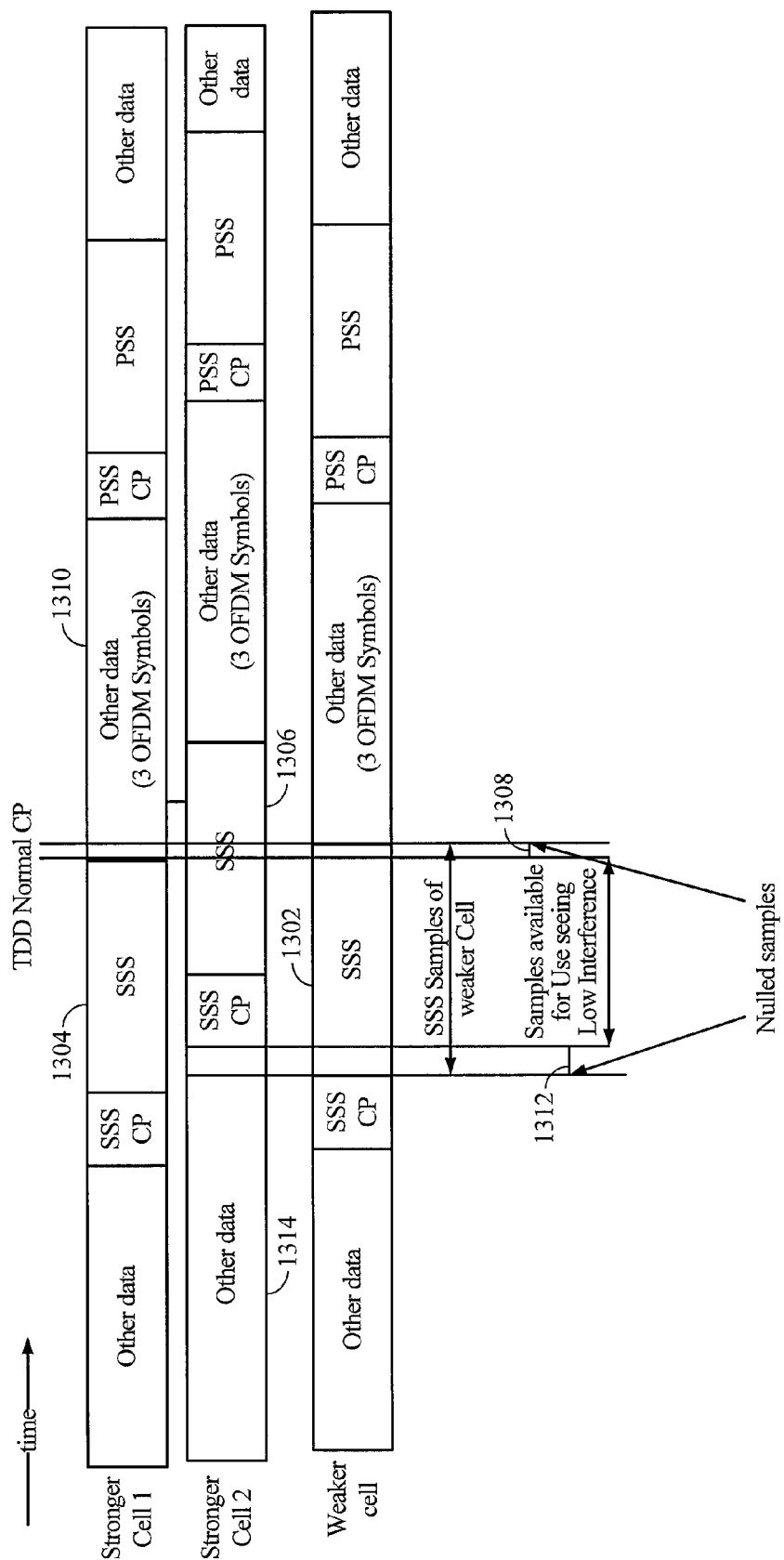
FIG. 13 illustrates an overlap scenario for TDD signals for determining the cell identities of stronger cells and a weaker cell, in accordance with certain aspects of the present disclosure.

In certain aspects, when a weaker cell experiences interference from multiple stronger cells, portions of the weaker cell SSS may have to be nulled out that see interference from signals of the multiple cells. For example, FIG. 13 illustrates an overlap scenario for TDD signals for determining the cell identities of stronger cells and weaker cells, in accordance with certain aspects of the present disclosure. An SSS 1302 of a weaker cell overlaps an SSS 1304 of a stronger cell 1 and an SSS 1306 of a stronger cell 2. As discussed above, SSS 1304 and 1306 may be cancelled. A portion 1308 from the SSS 1302 may experience interference from the other data portion 1310 of the stronger cell 1 that has not been cancelled. In addition, a portion 1312 from the SSS 1302 may experience interference from the other data portion 1314 of the stronger cell 2 that has not been cancelled. In this case, while performing SSS detection of the weaker cell, the effects of the portions 1308 and 1312 of the SSS 1302 of the weaker cell corresponding to the other data portions 1310 and 1314, respectively, of the stronger cells may be reduced either by not considering samples for the portions 1310 and 1314, or by giving them lower weight. In certain aspects, weights for different portions may be different and may depend on the received power of the corresponding stronger cells.

Figure 10:
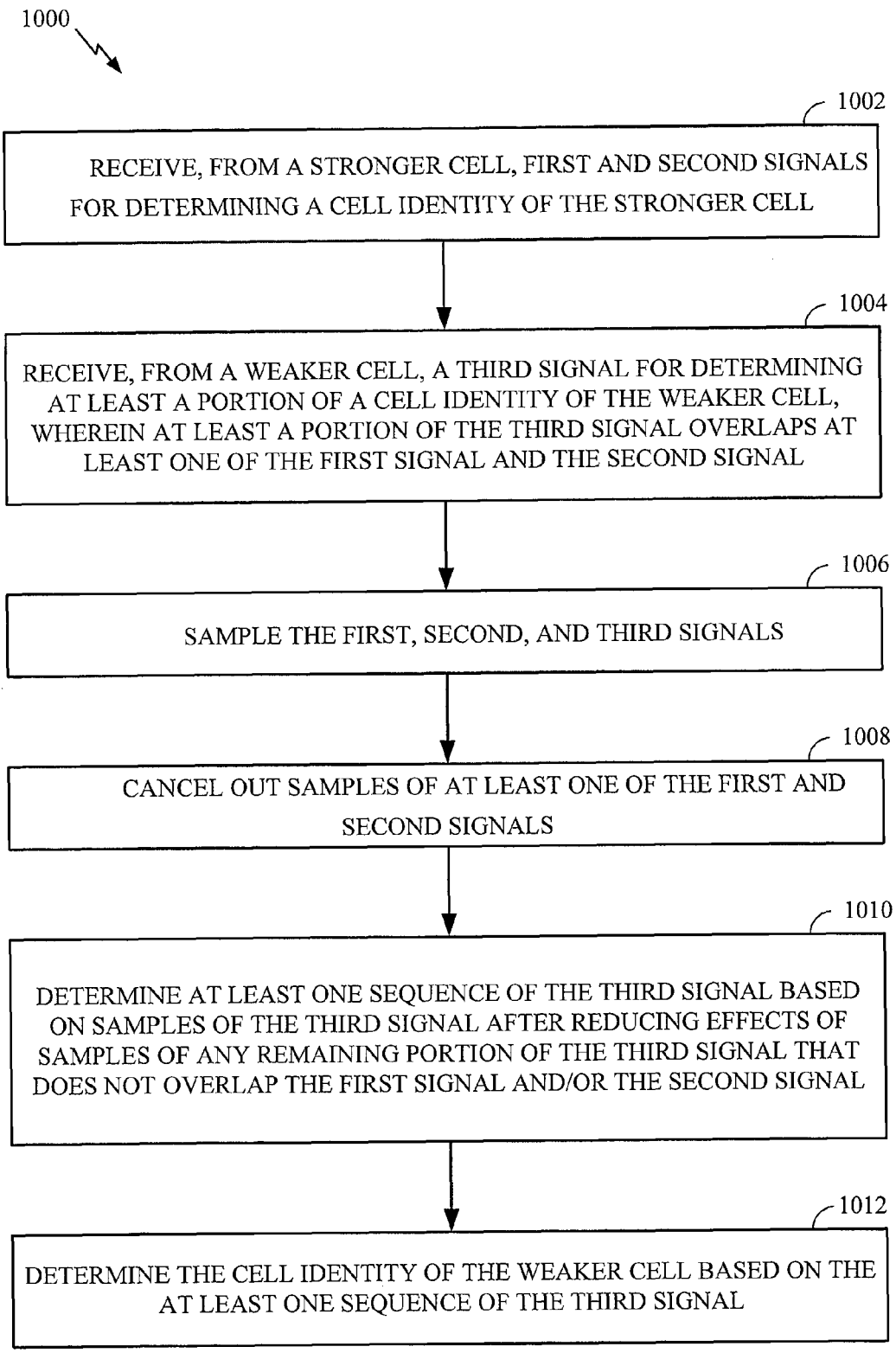
FIG. 10 is a functional block diagram conceptually illustrating example blocks executed to determine, from the perspective of the UE, at least one sequence of a signal for determining a cell identity of a weaker cell by reducing effects of samples of any portion of the signal that does not overlap signals for determining a cell identity of a stronger cell, in accordance with certain aspects of the present disclosure.

FIG. 10 is a functional block diagram conceptually illustrating example blocks 1000 executed, from the perspective of the UE, to determine at least one sequence of a signal for determining a cell identity of a weaker cell by reducing effects of samples of any portion of the signal that does not overlap signals for determining a cell identity of a stronger cell. Operations illustrated by the blocks 1000 may be executed, for example, at the processor(s) 358 and/or 380 of the UE 120 from FIG. 3.

The operations may begin at block 1002 by receiving, from a stronger cell, first and second signals for determining a cell identity of the stronger cell. In an aspect, the first signal includes a PSS from the stronger cell and the second signal includes an SSS from the stronger cell. At block 1004, the UE 120 may receive, from a weaker cell, a third signal for determining a cell identity of the weaker cell. In an aspect, the third signal includes an SSS from the weaker cell. At least a portion of the third signal may overlap the first signal and/or the second signal. The UE may sample the first, second, and third signals at block 1006. At block 1008, the UE may cancel out samples of the first and/or the second signals. At least one sequence of the third signal may be determined at block 1010 based on samples of the third signal after reducing effects of samples of any remaining portion of the third signal that does not overlap the first signal and/or the second signal. At block 1012, the UE may determine the cell identity of the weaker cell based on the at least one sequence of the third signal. For certain aspects, the UE may determine the cell identity of the weaker cell directly from the at least one sequence of the third signal, without first determining the PSS, since the SSS is scrambled using the PSS sequence (i.e., by searching over the 168 (sequences for a fixed PSS)*3 (all PSS choices)=504 different possibilities for the SSS).

For certain aspects, if there is any remaining portion of the third signal that does not overlap the first signal and/or the second signal, the UE may reduce the effects of the samples of this remaining portion by ignoring (i.e., not considering) the samples of this remaining portion when determining the at least one sequence of the third signal. For other aspects, the UE may weight the samples of the third signal, such that the samples of the remaining portion of the third signal are given a lower weight than other samples of the third signal. The UE may then determine the at least one sequence of the third signal at block 1010 based on the weighted samples of the third signal.

In certain aspects, in addition to receiving the SSS from the weaker cell, a PSS may also be received from the weaker cell. An additional sequence may be determined based on the PSS of the weaker cell and the cell identity of the weaker cell may be determined based on the sequences of the SSS and the PSS.

Figure 10A:
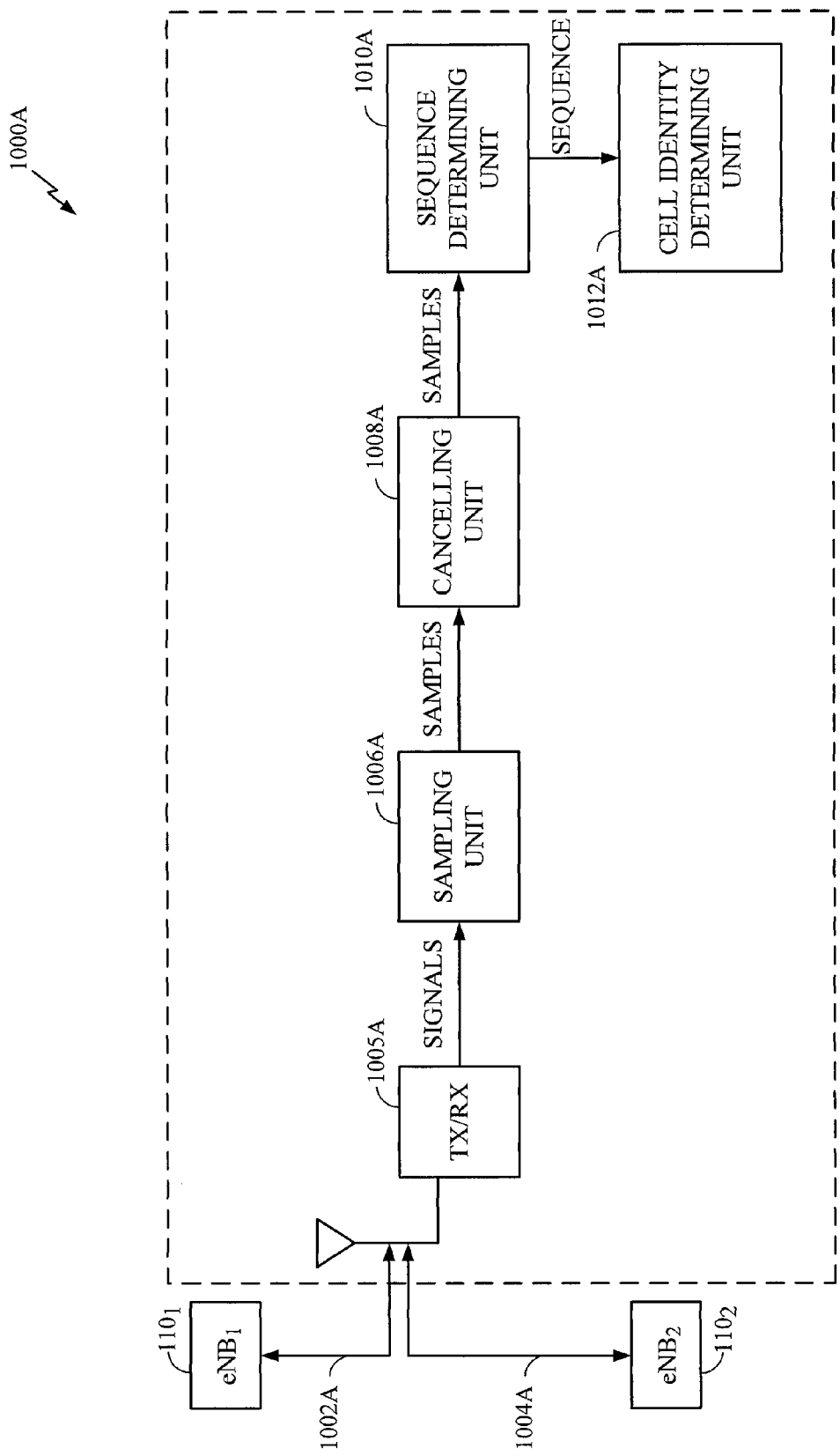
FIG. 10A illustrates example components capable of performing the operations illustrated in FIG. 10.

The operations 1000 described above may be performed by any suitable components or other means capable of performing the corresponding functions of FIG. 10. For example, operations 1000 illustrated in FIG. 10 correspond to components 1000A illustrated in FIG. 10A. In FIG. 10A, a transceiver (TX/RX) 1005A may receive, from a stronger cell (e.g., $eNB_1$) at 1002A, first and second signals for determining a cell identity of the stronger cell. At 1004A, the transceiver 1005A may receive, from a weaker cell (e.g., $eNB_2$), a third signal for determining a cell identity of the weaker cell, wherein at least a portion of the third signal may overlap the first signal and/or the second signal. A sampling unit 1006A may sample the first, second, and third signals. A cancelling unit 1008A may cancel out samples of the first and/or the second signals. A sequence determining unit 1010A may determine at least one sequence of the third signal based on samples of the third signal after reducing effects of samples of any remaining portion of the third signal that does not overlap the first signal and/or the second signal. A cell identity determining unit 1012A may determine the cell identity of the weaker cell based on the at least one sequence of the third signal.

Referring back to FIG. 9, with the enhanced ICIC (eICIC) solutions in Rel-10 and beyond, the strong cell(s) may almost blank the other data portion 1012 (including RS/PBCH/PDSCH and/or control part) when TDM/FDM resource partitioning is used. Alternatively, with the power control solution in eICIC, the strong cell(s) may reduce the transmission power of the other data portion (including RS/PBCH/PDSCH and/or control part). In this case, to detect weaker cells with large timing offset hypothesis, it may be beneficial for the UE to only use (or give higher weight to) the SSS bursts corresponding to the subframes where the other data portion is almost blank or is transmitted with reduced transmission power.

Figure 11:
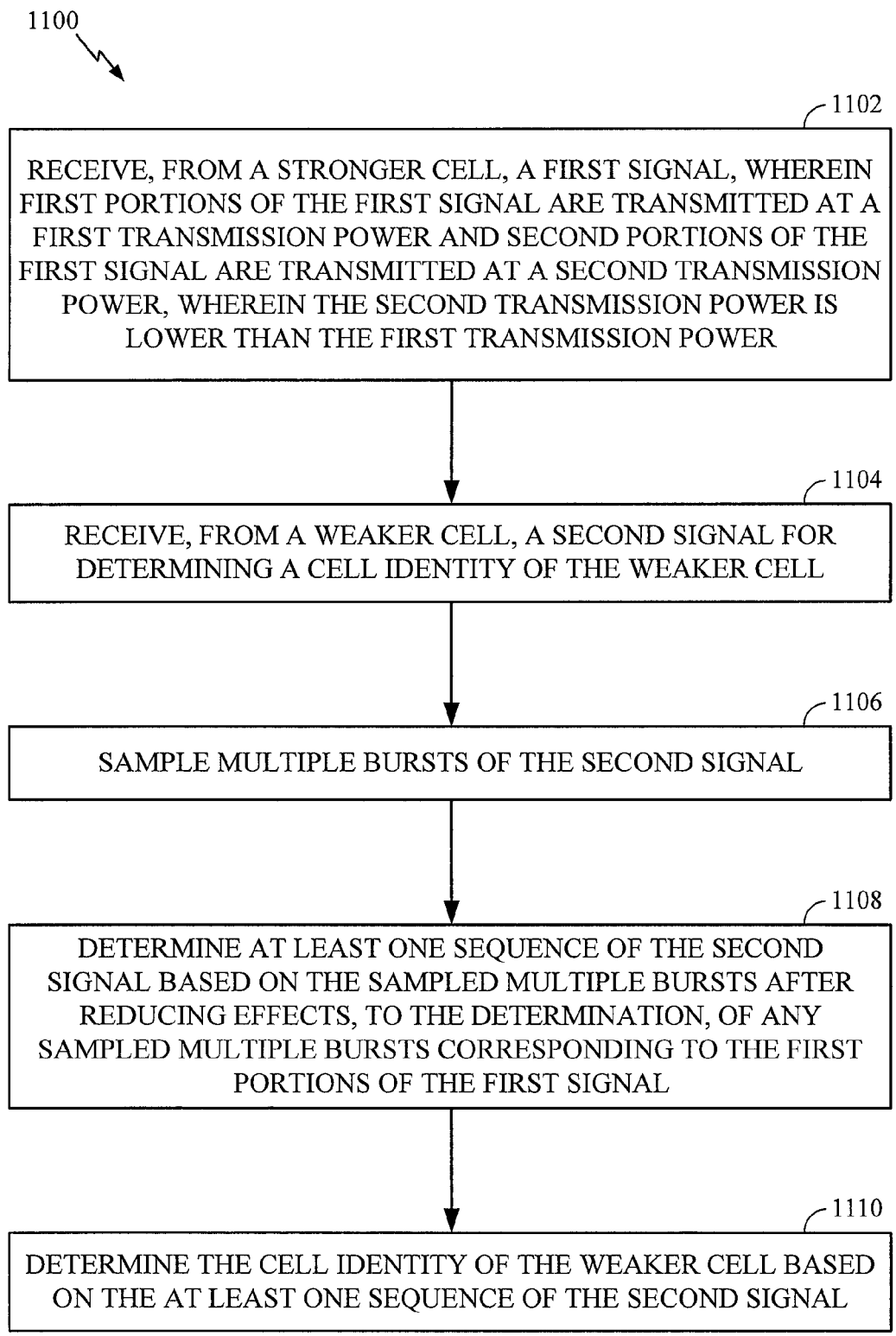
FIG. 11 is a functional block diagram conceptually illustrating example blocks executed to determine, from the perspective of the UE, at least one sequence of a signal for determining a cell identity of a weaker cell by reducing effects of sampled multiple bursts of the second signal corresponding to portions of a signal received from a stronger cell with a higher transmission power than other portions of the signal received from the stronger cell with a lower transmission power, from the perspective of the UE, in accordance with certain aspects of the present disclosure.

FIG. 11 is a functional block diagram conceptually illustrating example blocks 1100 executed, from the perspective of the UE, to determine at least one sequence of a signal for determining a cell identity of a weaker cell by reducing effects of sampled multiple bursts of the second signal corresponding to portions of a signal received from a stronger cell with a higher transmission power than other portions of the signal received from the stronger cell with a lower transmission power. Operations illustrated by the blocks 1100 may be executed, for example, at the processor(s) 358 and/or 380 of the UE 120 from FIG. 3.

The operations may begin at block 1102 by receiving, from a stronger cell, a first signal, wherein first portions of the first signal are transmitted at a first transmission power and second portions of the first signal are transmitted at a second transmission power, wherein the second transmission power is lower (in some cases, much lower) than the first transmission power. For certain aspects, the first signal may comprise at least one of a reference signal (RS), a physical broadcast channel (PBCH), a physical downlink shared channel (PDSCH), a control signal from the stronger cell, or any combination thereof.

At block 1104, the UE 120 may receive, from a weaker cell, a second signal for determining a cell identity of the weaker cell and may, at block 1106, sample multiple bursts of the second signal. In an aspect, the second signal includes an SSS from the weaker cell. At least one sequence of the second signal may be determined at block 1108 based on the sampled multiple bursts after reducing effects, to the determination, of any sampled multiple bursts corresponding to the first portions of the first signal. At block 1110, the UE may determine the cell identity of the weaker cell based on the at least one sequence of the second signal.

For certain aspects, if there are any sampled multiple bursts corresponding to the first portions of the first signal, the UE may reduce the effects of these sampled multiple bursts by ignoring (i.e., not considering) these sampled multiple bursts when determining the at least one sequence of the second signal. For other aspects, the UE may reduce the effects of these particular sampled multiple bursts by weighting the sampled multiple bursts, such that the sampled multiple bursts corresponding to the first portions of the first signal are given a lower weight than the sampled multiple bursts corresponding to the second portions of the first signal. The UE may then determine the at least one sequence of the second signal at block 1108 based on the weighted sampled bursts of the second signal.

In certain aspects, determining the at least one sequence of the second signal includes determining two sequences of the second signal, wherein the bursts of the second signal alternate between the two sequences.

In certain aspects, in addition to receiving the SSS from the weaker cell, a PSS may also be received from the weaker cell. An additional sequence may be determined based on the PSS, and the cell identity of the weaker cell may be determined based on the sequences of the SSS and the PSS.

Figure 11A:
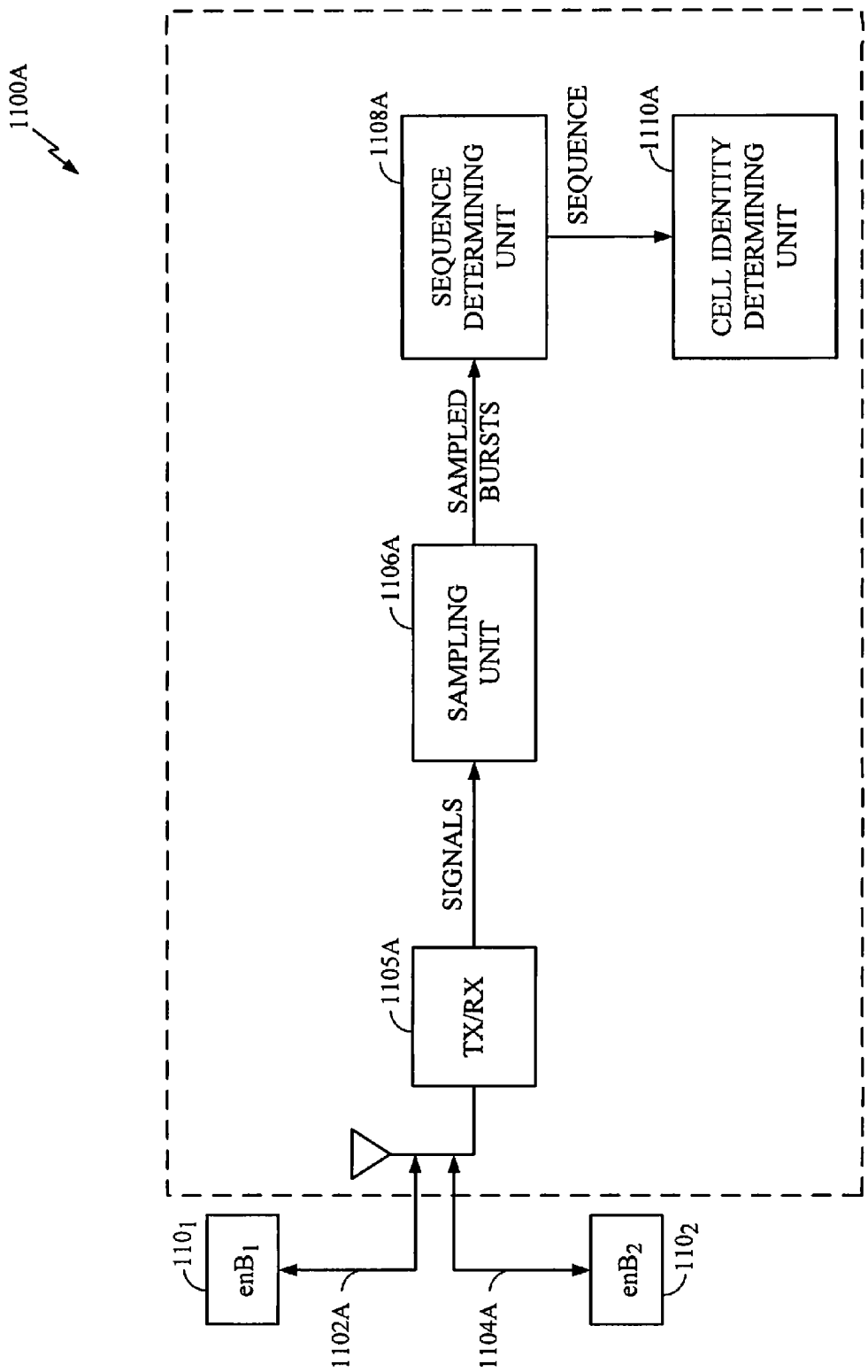
FIG. 11A illustrates example components capable of performing the operations illustrated in FIG. 11.

The operations 1100 described above may be performed by any suitable components or other means capable of performing the corresponding functions of FIG. 11. For example, operations 1100 illustrated in FIG. 11 correspond to components 1100A illustrated in FIG. 11A. In FIG. 11A, a transceiver (TX/RX) 1105A may receive, from a stronger cell (e.g., eNB$_1$) at 1102A, a first signal, wherein first portions of the first signal are transmitted at a first transmission power and second portions of the first signal are transmitted at a second transmission power, wherein the second transmission power is lower (in some cases, much lower) than the first transmission power. At 1104A, the transceiver 1105A may receive, from a weaker cell (e.g., eNB$_2$), a second signal for determining a cell identity of the weaker cell. A sampling unit 1106A may sample multiple bursts of the second signal. A sequence determining unit 1108A may determine at least one sequence of the second signal based on the sampled multiple bursts after reducing effects, to the determination, of any sampled multiple bursts corresponding to the first portions of the first signal. A cell identity determining unit 1110A may determine the cell identity of the weaker cell based on the at least one sequence of the second signal.

Any two or more of the techniques and apparatus described above may be combined for certain aspects. For example, the sampling of the multiple bursts described in FIG. 11 may be performed with non-uniform spacing between the sampling intervals, as described in conjunction with FIG. 8.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting or means for sending may comprise a transmitter, a modulator 354, and/or an antenna 352 of the UE 120 depicted in FIG. 3 or a transmitter, a modulator 332, and/or an antenna 334 of the eNB 110 shown in FIG. 3. Means for receiving may comprise a receiver, a demodulator 354, and/or an antenna 352 of the UE 120 depicted in FIG. 3 or a receiver, a demodulator 332, and/or an antenna 334 of the eNB 110 shown in FIG. 3. Means for processing, means for determining, means for sampling, and/or means for cancelling out may comprise a processing system, which may include at least one processor, such as the transmit processor 320, the receive processor 338, or the controller/processor 340 of the eNB 110 or the receive processor 358, the transmit processor 364, or the controller/processor 380 of the UE 120 illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
   transmitting, by a first base station, in accordance with a coordinated resource partitioning technique allocating subframes between the first base station and at least a second base station,
   wherein during a first portion of a subframe the first base station transmits at a first transmission power and during a second portion of the subframe the first base station transmits at a second transmission power, wherein the second portion of the subframe includes at least one of a physical broadcast channel (PBCH) or a physical downlink shared channel (PDSCH) and the second transmission power is lower than the first transmission power, and
   wherein the subframe corresponds to a protected subframe allocated to the second base station in accordance with the coordinated resource partitioning technique, and wherein the first base station transmits at the second transmission power during the subframe based on the subframe corresponding to the protected subframe.

2. The method of claim 1, wherein the first base station transmits a reference signal (RS) during the first portion of the subframe.

3. The method of claim 1, wherein the first base station transmits a primary synchronization signal (PSS) during the first portion of the subframe.

4. The method of claim 1, wherein the first base station transmits a secondary synchronization signal (SSS) during the first portion of the subframe.

5. The method of claim 1, wherein the first base station transmits a control signal during the first portion of the subframe.

6. An apparatus for wireless communications, comprising:
   means for transmitting, by a first base station, in accordance with a coordinated resource partitioning technique allocating subframes between the first base station and at least a second base station;
   means for causing, during a first portion of a subframe, the first base station to transmit at a first transmission power; and
   means for causing, during a second portion of the subframe, the first base station to transmit at a second transmission power,
   wherein the second portion of the subframe includes at least one of a physical broadcast channel (PBCH) or a physical downlink shared channel (PDSCH) and the second transmission power is lower than the first transmission power, and
   wherein the subframe corresponds to a protected subframe allocated to the second base station in accordance with the coordinated resource partitioning technique, and wherein the first base station transmits at the second transmission power during the subframe based on the subframe corresponding to the protected subframe.

7. The apparatus of claim 6, wherein the first base station transmits a reference signal (RS) during the first portion of the subframe.

8. The apparatus of claim 6, wherein the first base station transmits a primary synchronization signal (PSS) during the first portion of the subframe.

9. The apparatus of claim 6, wherein the first base station transmits a secondary synchronization signal (SSS) during the first portion of the subframe.

10. The apparatus of claim 6, wherein the first base station transmits a control signal during the first portion of the subframe.

11. An apparatus for wireless communications, comprising:
    a transmitter; and
    at least one processor configured to:
        transmit, by a first base station, in accordance with a coordinated resource partitioning technique allocating subframes between the first base station and at least a second base station, wherein during a first portion of a subframe the first base station transmits at a first transmission power and during a second portion of the subframe the first base station transmits at a second transmission power, wherein the second portion of the subframe includes at least one of a physical broadcast channel (PBCH) or a physical downlink shared channel (PDSCH) and the second transmission power is lower than the first transmission power, wherein the subframe corresponds to a protected subframe allocated to the second base station in accordance with the coordinated resource partitioning technique, and wherein the first base station transmits at the second transmission power during the subframe based on the subframe corresponding to the protected subframe.

12. The apparatus of claim 11, wherein the first base station transmits a reference signal (RS) during the first portion of the subframe.

13. The apparatus of claim 11, wherein the first base station transmits a primary synchronization signal (PSS) during the first portion of the subframe.

14. The apparatus of claim 11, wherein the first base station transmits a secondary synchronization signal (SSS) during the first portion of the subframe.

15. The apparatus of claim 11, wherein the first base station transmits a control signal during the first portion of the subframe.

16. A computer-program product for wireless communications, stored on a non-transitory computer-readable medium, and comprising code for performing the steps of:

transmitting, by a first base station, in accordance with a coordinated resource partitioning technique allocating subframes between the first base station and at least a second base station;

causing, during a first portion of a subframe, the first base station to transmit at a first transmission power; and causing, during a second portion of the subframe, the first base station to transmit at a second transmission power, wherein the second portion of the subframe includes at least one of a physical broadcast channel (PBCH) or a physical downlink shared channel (PDSCH) and the second transmission power is lower than the first transmission power, and wherein the subframe corresponds to a protected subframe allocated to the second base station in accordance with the coordinated resource partitioning technique, and wherein the first base station transmits at the second transmission power during the subframe based on the subframe corresponding to the protected subframe.

17. The computer-program product of claim 16, wherein the first base station transmits a reference signal (RS) during the first portion of the subframe.

18. The computer-program product of claim 16, wherein the first base station transmits a primary synchronization signal (PSS) during the first portion of the subframe.

19. The computer-program product of claim 16, wherein the first base station transmits a secondary synchronization signal (SSS) during the first portion of the subframe.

20. The computer-program product of claim 16, wherein the first base station transmits a control signal during the first portion of the subframe.

* * * * *